United States Patent
Gu et al.

(10) Patent No.: US 7,395,254 B2
(45) Date of Patent: Jul. 1, 2008

(54) METHOD FOR DYNAMIC KNOWLEDGE CAPTURING IN PRODUCTION PRINTING WORKFLOW DOMAIN

(75) Inventors: Xue Gu, Rochester, NY (US); Tong Sun, Penfield, NY (US); Alan Thomas Coté, Walworth, NY (US); Michael David Shepherd, Ontario, NY (US)

(73) Assignee: Xerox Corporation, Stamford, CT (US)

(*) Notice: Subject to any disclaimer, the term of this patent is extended or adjusted under 35 U.S.C. 154(b) by 414 days.

(21) Appl. No.: 11/111,387

(22) Filed: Apr. 21, 2005

(65) Prior Publication Data

US 2006/0242097 A1    Oct. 26, 2006

(51) Int. Cl.
*G06F 17/00* (2006.01)
*G06N 5/00* (2006.01)
*G06N 5/02* (2006.01)

(52) U.S. Cl. .......................... 706/50; 706/45
(58) Field of Classification Search .............. 706/50, 706/45
See application file for complete search history.

(56) References Cited

U.S. PATENT DOCUMENTS

| | | | | |
|---|---|---|---|---|
| 5,499,366 A * | 3/1996 | Rosenberg et al. | ............ | 707/4 |
| 5,555,201 A * | 9/1996 | Dangelo et al. | ............ | 716/1 |
| 5,615,341 A * | 3/1997 | Agrawal et al. | ............ | 705/10 |
| 5,794,209 A | 8/1998 | Agrawal et al. | | |
| 5,801,958 A * | 9/1998 | Dangelo et al. | ............ | 716/18 |
| 5,892,900 A * | 4/1999 | Ginter et al. | ............ | 726/26 |
| 5,910,987 A * | 6/1999 | Ginter et al. | ............ | 705/52 |
| 5,915,019 A * | 6/1999 | Ginter et al. | ............ | 705/54 |
| 5,917,912 A * | 6/1999 | Ginter et al. | ............ | 713/187 |
| 5,949,876 A * | 9/1999 | Ginter et al. | ............ | 705/80 |
| 5,982,891 A * | 11/1999 | Ginter et al. | ............ | 705/54 |
| 6,031,537 A * | 2/2000 | Hugh | ............ | 715/854 |
| 6,061,506 A * | 5/2000 | Wollaston et al. | ............ | 703/23 |
| 6,173,280 B1 | 1/2001 | Ramkumar et al. | | |
| 6,237,786 B1 * | 5/2001 | Ginter et al. | ............ | 213/153 |
| 6,253,193 B1 * | 6/2001 | Ginter et al. | ............ | 705/57 |
| 6,256,032 B1 * | 7/2001 | Hugh | ............ | 715/854 |

(Continued)

OTHER PUBLICATIONS

The automatic compression of multiple classification ripple down rule knowledge based systems: preliminary experiments Suryanto, H.; Richards, D.; Compton P.; Knowledge-Based Intelligent Information Engineering Systems, 1999. Third International Conference Aug. 31-Sep. 1, 1999 pp. 203-206.*

(Continued)

*Primary Examiner*—Michael B. Holmes
(74) *Attorney, Agent, or Firm*—Carter, DeLuca, Farrell & Schmidt, LLP

(57) ABSTRACT

A system and method are provided for managing a knowledge base system storing a plurality of data instances, each data instance including at least one field, each field having at least one item and provided with an associated field type indicating whether the field is allowed to have only a single item or multiple items. At least one large itemset is determined by generating a plurality of itemsets formed of possible combinations of items selected from items corresponding to fields of the stored data instances. Itemsets having a combination of more than one item corresponding to a field having an associated field type indicating that the field is allowed to have only a single value are eliminated. The remaining itemsets are processed for generating associate rules.

22 Claims, 2 Drawing Sheets

U.S. PATENT DOCUMENTS

| | | | | |
|---|---|---|---|---|
| 6,256,773 | B1 * | 7/2001 | Bowman-Amuah | 717/121 |
| 6,268,853 | B1 * | 7/2001 | Hoskins et al. | 700/83 |
| 6,324,647 | B1 * | 11/2001 | Bowman-Amuah | 726/23 |
| 6,363,488 | B1 * | 3/2002 | Ginter et al. | 726/1 |
| 6,370,573 | B1 * | 4/2002 | Bowman-Amuah | 709/223 |
| 6,389,402 | B1 * | 5/2002 | Ginter et al. | 705/51 |
| 6,405,364 | B1 * | 6/2002 | Bowman-Amuah | 717/101 |
| 6,427,140 | B1 * | 7/2002 | Ginter et al. | 705/80 |
| 6,473,794 | B1 * | 10/2002 | Guheen et al. | 709/223 |
| 6,502,102 | B1 * | 12/2002 | Haswell et al. | 707/102 |
| 6,519,571 | B1 * | 2/2003 | Guheen et al. | 705/14 |
| 6,523,026 | B1 * | 2/2003 | Gillis | 707/3 |
| 6,523,027 | B1 * | 2/2003 | Underwood | 707/4 |
| 6,536,037 | B1 * | 3/2003 | Guheen et al. | 717/151 |
| 6,556,950 | B1 * | 4/2003 | Schwenke et al. | 702/183 |
| 6,601,233 | B1 * | 7/2003 | Underwood | 717/102 |
| 6,606,744 | B1 * | 8/2003 | Mikurak | 717/174 |
| 6,609,128 | B1 * | 8/2003 | Underwood | 707/10 |
| 6,611,822 | B1 * | 8/2003 | Beams et al. | 706/11 |
| 6,615,166 | B1 * | 9/2003 | Guheen et al. | 703/27 |
| 6,618,856 | B2 * | 9/2003 | Coburn et al. | 717/135 |
| 6,629,081 | B1 * | 9/2003 | Cornelius et al. | 705/30 |
| 6,633,878 | B1 * | 10/2003 | Underwood | 707/100 |
| 6,640,304 | B2 * | 10/2003 | Ginter et al. | 713/193 |
| 6,662,357 | B1 * | 12/2003 | Bowman-Amuah | 717/120 |

OTHER PUBLICATIONS

Preserving and generating objects in the Living in a Lattice rule language Heuer, A.; Sander, P.; Data Engineering, 1991. Proceedings. Seventh International Conference on Apr. 8-12, 1991 pp. 562-569.*

Object oriented rule-based control on a personal computer Vadhwana, V.; Use of Personal Computer Systems for Plant Monitoring and Control, IEE Colloquium on Mar 23, 1989 pp. 6/1-6/5.*

The effect of knowledge representation schemes on maintainability of knowledge-based systems Sunro Lee; O'Keefe, R.M.; Knowledge and Data Engineering, IEEE Transactions on vol. 8, Issue 1, Feb. 1996 pp. 173-178.*

Solving contradiction in knowledge-base without interaction Katsurada, K.; Koyama, M.; Ohara, K.; Babaguchi, N.; Kitahashi, T.; Systems, Man, and Cybernetics, 1998. 1998 IEEE International Conference on vol. 2, Oct. 11-14, 1998 pp. 1546-1551 vol. 2.*

Rule-based noise detection for software measurement data Khoshgoftaar, T.M.; Seliya, N.; Gao, K.; Information Reuse and Integration, 2004. IRI 2004. Proceedings of the 2004 IEEE International Conference on Nov. 8-10, 2004 pp. 302-307.*

Capture database semantics by rule induction Chu, W.W.; Lee, R.C.; Databases, Parallel Architectures and Their Applications,. PARBASE-90, International Conference on Mar. 7-9, 1990 pp. 235.*

From databases to rule bases Oxman, S.W.; Developing and Managing Intelligent System Projects, 1993., IEEE International Conference on Mar. 29-31, 1993 pp. 168-173.*

Knowledge based simulation for process monitoring and regulatory control Pokkunuri, B.; Intelligent Systems Engineering vol. 3, Issue 1, Spring 1994 pp. 9-19.*

Guided expert self-elicitation: generalizing captured expertise Shephard, G.G.; System Sciences, 1991. Proceedings of the Twenty-Fourth Annual Hawaii International Conference on vol. iii, Jan. 8-11, 1991 pp. 235-243 vol. 3.*

Research on Application of Development Method of Knowledge Base in the Integrated System for ICAD Pengshou Xie; Yongping Kang; Qiuyu Zhang; Parallel and Distributed Computing, Applications and Technologies, 2005. PDCAT 2005. Sixth International Conference on Dec. 5-8, 2005 pp. 1017-1020.*

Context-aware design of adaptable multimodal documents Celentano, A.; Gaggi, O.; Multimedia Software Engineering, 2004. Proceedings. IEEE Sixth International Symposium on Dec. 13-15, 2004 pp. 427-434.*

Rakesh Agrawal, et al., "Fast Algorithms for Mining Association Rules", Proceedings of the 20th Very Large Data Bases Conference, Santiago, Chile, 1994.

Rakesh Agrawal, et al., "Mining Association Rules Between Sets of Items in Large Databases", Proceedings of the 1993 Association for Computing Machinery Special Interest Group on Management of Data, International Conference on Management on Data, pp. 207-216, Washington, D.C., USA, May 1993.

Alvaro E. Monge, et al., "The Field Matching Problem: Algorithms and Applications", Proceedings of the Second International Conference on Knowledge Discovery and Data Mining, 1996.

Mong Li Lee, et al., Cleansing Data for Mining and Warehousing, Proceedings of the 10th International Conference on Database and Expert Systems Applications, pp. 751-760, Aug. 30-Sep. 3, 1999.

* cited by examiner

US 7,395,254 B2

METHOD FOR DYNAMIC KNOWLEDGE CAPTURING IN PRODUCTION PRINTING WORKFLOW DOMAIN

BACKGROUND

This disclosure relates generally to data processing, and more particularly to a system and method for managing a knowledge base. In an adaptive workflow modeling project the domain knowledge model needs to be flexible and adaptive as new information becomes available, For example, in a production printing workflow domain, a comprehensive knowledge model captures multiple layers of semantics about user constraints, a wide range of product offerings and their capabilities, production printing workflow patterns, business partners and competitors, etc. The knowledge model may be built on current subject matter expertise in five market defined production workflow environments: book printing, print-on-demand, personal communication, transactional and promotional printing, and unified offset and digital printing. However, as the market and technology constantly evolve, new products or devices become available, new partnerships are formed around the world, and new markets and competitors emerge.

Accordingly, in an adaptive knowledge base system, as information evolves new instances of knowledge must be entered into the repository or knowledge base without redundancy. Algorithms exist for determining if a knowledge instance to be entered into the knowledge base already exists for avoiding instance redundancy. A number of algorithms for preventing entry of a redundant information instance is described by A. E. Monge and C. P. Elkan in "The Field Matching Problem: Algorithms and Applications", *Proceedings Of the 2nd International Conference of Knowledge Discovery and Data Mining*, pages 267-270, 1996. Specifically, Monge et al, describes algorithms for finding matching information which indicates redundancy, including a basic field matching algorithm for string matching and a recursive algorithm for finding abbreviations which match a non-abbreviated knowledge instance. The basic field matching algorithm does not handle abbreviation, and the recursive algorithm has quadratic time complexity.

Another algorithm for preventing entry of a redundant information instance is described by Mong Li Lee, Hongjun Lu, Tok Wang Ling and Yee Teng Ko in "Cleansing Data for Mining and Warehousing", *Proceedings of the 10th International Conference on Database and Expert Systems Applications (DEXA)*, Florence, Italy, August 1999, for finding matching information and determining the existence of redundancy. However, the algorithm described does not take character sequence into account.

In a process known as rule mining, patterns, relationships and associations within a knowledge base are uncovered. The knowledge base holds a set of values or items, wherein a subset of the database including a particular set of items is known as an itemset. The percentage of occurrences of a particular itemset is known as support for the itemset. Itemsets whose support exceeds a predetermined threshold are known as large itemsets. The ratio of frequency of occurrence of a subset of the large itemset to the frequency of occurrence of the large itemset in the knowledge base is used for establishing an associate rule, where a confidence factor for the rule is related to the strength of the rule.

The support and confidence factors associated with established association rules are indicative of patterns, relationships and associations within the knowledge base. As new knowledge instances are added to the knowledge base, new association rules must be established and the association rules must be must be updated. Algorithms for rule mining are described in R. Agrawal, T. Imielinski, and A. Swami in "Mining Association Rules Between Sets of Items in Large Databases", *Proceedings Of The ACM SIGMOD Conference on Management of Data*, Washington, D.C., May 1993; and by M. Houtsma and A. Swami in "Set-Oriented Mining of Association Rules", *Research Report RJ 9567*, IBM Almaden Research Center, San Jose, Calif., October 1993. However, the described algorithms are inefficient in that the ratio of potential large itemsets to the final output of itemsets from which the rules are derived is exceedingly large.

A well known Apriori algorithm is described by R. Agrawal, R. Srikant in "Fast algorithms for mining association rules", *Proceedings Of the 20th International Conference in Very Large Databases*, Santiago, Chile, September 1994 which reduces the number of itemsets that need to be counted for generating large itemsets. The Apriori algorithm makes multiple passes over data stored in the knowledge base. In the first pass, the support values of individual itemsets are counted and decided whether they are large. In subsequent passes, the itemsets to be processed include only the large itemsets found in the previous pass. For each pass a new set of potentially large itemsets, known as candidate itemsets, is generated, where the candidate itemsets are used as seeds for the next pass. The process continues until no new large datasets are found. However, the Apriori algorithm is inefficient in that candidate itemsets are typically formed of items that would not be combined into an actual set.

SUMMARY

In the present disclosure two aspects of dynamic knowledge capturing are provided: (1) adding new knowledge instance information (such as new products, new devices, or new partners), and (2) updating the schema of the knowledge model (such as introducing new concepts and relationships, which may reflect on a new attribute and/or class in the knowledge model). These two aspects of knowledge updating (i.e., instance update and schematic update) are essential for dynamically capturing new knowledge over time, and ultimately enable the new knowledge to be easily accessed and shared by other users.

In a dynamic environment, when new products and devices become available, the new instances of product and device knowledge need to be updated in the knowledge base. Before committing the addition of a new knowledge instance, a field dependent heuristic de-duplication algorithm is proposed to reduce the instance redundancy in the knowledge base. Accordingly, the management of a knowledge base includes processing data received as input to the knowledge base, such as user interactions or data input from a remote device captured in an online log file for determining if the captured information (also referred to as a data instance) is a duplicate of a data instance which is already stored in the knowledge base for preventing duplicate data instances in the knowledge base, also referred to as redundancy.

In the present disclosure, the determination of duplicity includes comparing a received sequence of characters of a field of the received data instance with a stored sequence of characters of a corresponding field of a stored data instance and generating a score indicative of the comparison results. The scores generated for respective sequences of characters are processed for generating a score indicative of duplicity between the received data instance and the stored data instance, where the score is compared to a threshold for determining if the received data instance is a duplicate of the stored data instance. When comparing the received sequence and the stored sequence, the sequence of the characters is accounted for by sequentially comparing characters of the received sequence, including searching for a character which matches a character of the received sequence in characters of the stored sequence which follow a previously found matching character. Furthermore, for enumeration type fields the determination results of duplicity is simplified by assigning either a high or low value indicating that duplicity exists or not, respectively.

Relationships between data stored in the knowledge base, e.g., the schema, are encoded. More specifically, well supported relationships having suitable degrees of confidence are described by associate rules. As data is added to the knowledge base the relationships change and new relationships are formed. Updating of the knowledge schema involves a knowledge pattern mining and learning process. An associate rule mining algorithm based on a modified Apriori algorithm is proposed to extract new knowledge rules from user interactions or incoming data captured in an online log file. Newly learned knowledge rules (e.g., popularity rated workflow configurations per geo-region, preferred business partners per geo-region, etc.) are encoded into the knowledge schema.

As new data is added to the knowledge base, the knowledge base is managed by searching for new relationships and encoding associate rules which correspond to the new relationships. Associate rule mining includes creating combinations of items, also known as itemsets, which may be stored in various fields of the data instances, and then looking for occurrences of the itemsets in the data instances, and determining the frequency of the occurrences. In the present disclosure the itemsets created are minimized by eliminating itemsets which combine two or more items which may be stored in a field that holds (or has) only one item. By reducing the number of itemsets created, the processing time and processing load are greatly reduced.

In accordance with one aspect of the present disclosure there is provided a knowledge base system. The knowledge base system includes at least one processor and at least one storage device accessible by the at least one processor for storing a plurality of data instances. An interface device is provided for receiving at least one data instance. Furthermore, a memory is provided for storing a series of executable instructions executable by the at least one processor for capturing a received data instance and determining via a field dependent heuristic determination if the received data instance is a duplicate of any data instance of the plurality of stored data instances. The received data instance and the plurality of stored data instances each include at least one field each having an item, each item including at least one token, each token including a sequence of at least one character. The determination by the at least one processor includes, for each field of the received data instance, comparing between tokens of the at least one token of the field and the at least one token of a corresponding field of a respective stored data instance and generating at least one corresponding token similarity value. Each token comparison between a first token and a second token includes determining a degree of matching between characters of the at least one character of the first token that and the at least one character of the second token, including taking character sequence into account, and outputting a field similarity degree based on the at least one token similarity value. For each respective stored data instance, an instance similarity value is generated based on the field similarity degree corresponding to the respective fields of the received data instance. The determination of duplicity between the received data instance and the respective stored data instance is based on the instance similarity value.

Pursuant to another aspect of the present disclosure, a knowledge base system is provided. The knowledge base system includes at least one storage device accessible by at least one processor for storing a plurality of data instances. The knowledge base system further includes a memory storing a series of executable instructions executable by the at least one processor for generating at least one associate rule associated with a plurality of stored data instances. The plurality of stored data instances each include at least one field, each having at least one item and an associated field type for indicating whether the field is allowed to have one of only a single item and multiple items. The generating the at least one associate rule by the at least one processor includes generating a plurality of itemsets formed of possible combinations of at least one item selected from the at least one item corresponding to the at least one field of the plurality of stored data instances. At least one itemset is eliminated from the plurality of itemsets having a combination of more than one item corresponding to a field having an associated field type indicating that the field is allowed to have only a single value. At least one associate rule is derived by processing at least one remaining itemset.

Pursuant to yet another aspect of the present disclosure, a method is provided for managing a knowledge base system. The method includes storing a plurality of data instances, each data instance of the plurality of data instances including at least one field each having at least one item. The method further includes providing each field of the at least one field with an associated field type for indicating whether the field is allowed to have one of only a single item and multiple items, and generating a plurality of itemsets formed of possible combinations of at least one item selected from the at least one item corresponding to the at least one field of the plurality of stored data instances. The method further includes eliminating at least one itemsets having a combination of more than one item corresponding to a field having an associated field type indicating that the field is allowed to have only a single value. At least one associate rule is generated by processing at least one remaining itemset.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

Figure 1:
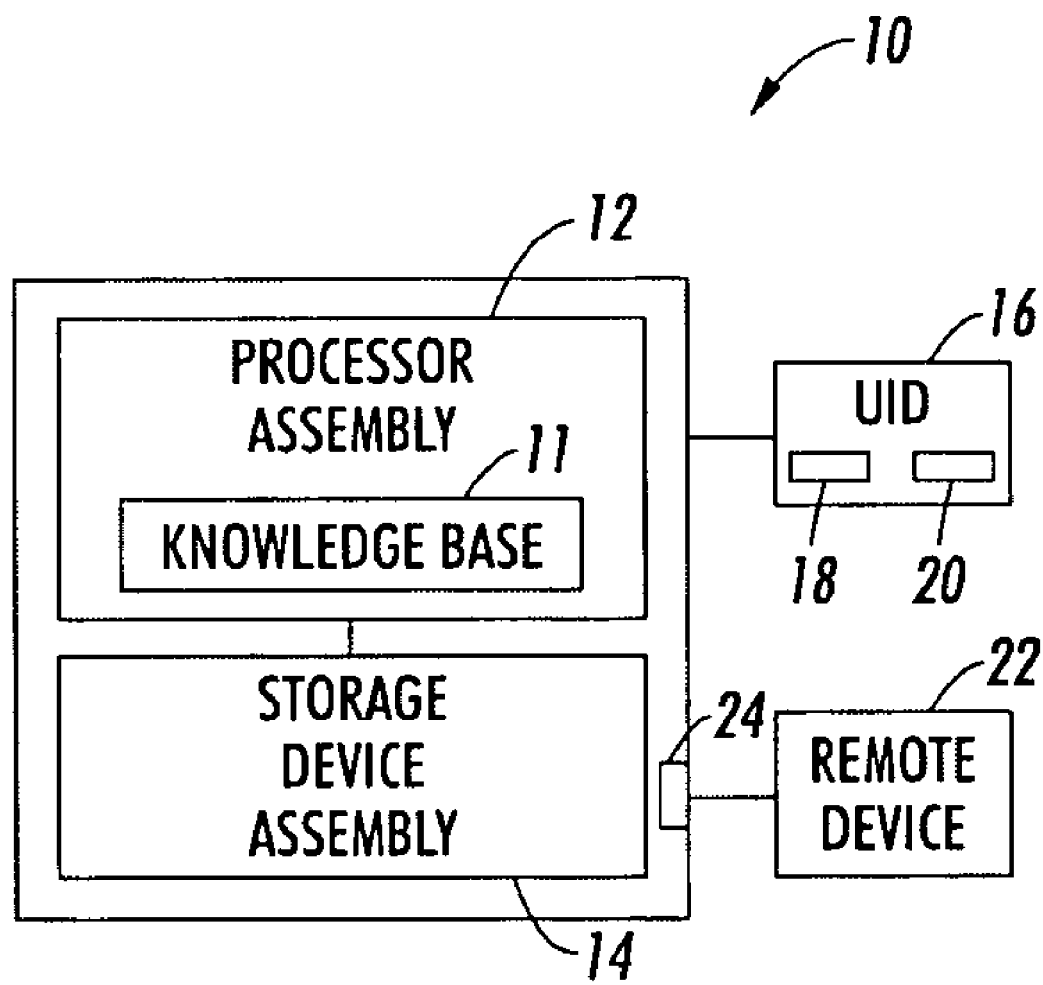
FIG. 1 is a block diagram of a knowledge base system in accordance with the present disclosure.

For a general understanding of the features of the present disclosure, reference is made to the drawings. In the drawings, like reference numerals have been used throughout to identify identical elements. In the disclosure, the term knowledge base refers to, for example, a repository for information, such as a database of information related to a particular subject. An exemplary knowledge base includes the software instructions executable by a processor for providing for collecting, organizing and retrieving the information, which may include providing access to local and/or remote users, such as via the Internet, e.g., for entering or retrieving information.

An exemplary knowledge base system includes a knowledge base, the storage device(s) which store the information and the processor(s) which execute the executable software instructions for the dissemination of information, generally online or with the capacity to be put online and may further include peripheral devices. An example of a data instance or instance is an entry of data into the knowledge base, such as data entry that is already stored in the knowledge base, e.g., as a record, or a data entry to be entered into the knowledge base.

With reference to FIG. 1, an exemplary knowledge base system 10 is shown including a knowledge base 11, a processor assembly 12 including at least one processor and a storage assembly 14 which is accessible by the processor assembly 12, the storage assembly 14 including at least one storage device. The knowledge base 11 structures the information in accordance with a taxonomy (e.g., a predetermined system of classification) and schema (e.g., a definition of the structure of the knowledge base, such as the names of fields and associated attributes), which is encoded, for example, as metadata. For a knowledge base related to an exemplary domain defined as a production printing workflow domain for handling information related to production printing workflow (e.g., the production of printed products at various stages from design to delivery), the classes or fields defined by the metadata may include, for example, services, devices, capability, products, etc. Also encoded are the relationships between the metadata and their functionality.

The knowledge base 11 includes a database for storing information, including executable software instructions executable by the processor assembly 12 for providing for collecting information, storing information in the storage assembly 14, organizing the information (including relationships between information) stored in the storage assembly 14, and retrieving information stored by the storage assembly 14. The knowledge base 11 includes a series of programmable instructions executable by the processor assembly 12 and or another processor external to the scanning device 12, such as the host processor.

The series of programmable instructions may be stored on a computer-readable medium (e.g., a memory), such as RAM, a hard drive, CD, smart card, 3.5" diskette, etc., or transmitted via propagated signals for being executed by the processor assembly 12 for performing the functions described herein and to achieve a technical effect in accordance with the disclosure. At least one of the storage devices of the storage assembly 14 may be included in the memory storing the series of programmable instructions, and the memory storing the series of programmable instructions may be included in the at least one storage device.

The at least one processor may include a microprocessor, a PC, a handheld computing device, a mobile phone, a mainframe computer, etc. Processors of the at least one processor may be included in one or more networks, such as a LAN, WAN, the Internet, etc. The processors may communicate via wired or wireless communication. The storage devices may include volatile or nonvolatile storage, such as RAM, ROM, Flash RAM, a computer readable medium, CD-ROM, etc.

The knowledge base system 10 further includes one or more interface devices, such as a user interface device (ULID) 16 or an interface 24. UID 16 may include a display 18 having a graphical user interface (GUI) and/or a user input device 20, such as a keyboard, touchpad, touch screen and/or pointer device (e.g., a mouse). Interface 24 interfaces between the processor assembly 12 and a remote device 22. The interface may be, for example, a modem, a serial interface, a parallel interface, etc., for facilitating wired or wireless communication between the processor assembly 12 and the remote device 22. The remote device 22 may be, for example, a handheld computing device, an optical code scanner, a mobile phone, etc.

Information is entered into the knowledge base 11 as instances, such as via the UID 16 or from a remote device 22 via interface 24. For example, the processor assembly 12 may prompt a user to enter information via the UID 16, such as via a questionnaire process having a pre-defined knowledge schema. The processor assembly 12 processes the information entered. Knowledge gathered via the questionnaire, if deemed as unique, may be added as a new instance to the knowledge base 11, or used for updating an instance which exists in the knowledge base 11. In the present example, instance knowledge gathered via the questionnaire may include information relating to the production printing domain, such as information relating to abstract service modules, concrete products, product capabilities, devices, business partners, competitors, media type, work flow patterns, etc.

The knowledge base 11 is dynamic, which is defined to mean that the knowledge base 11 is updated as new information is provided to the knowledge base 11, such as information reflecting evolving of the market and technology, availability of new products or devices, formation of new business partnerships, and emergence of new markets and competitors. Managing the knowledge base 11 as a dynamic knowledge base 11 includes updating the knowledge base 11 as new information becomes available, including adding new knowledge instances, updating stored knowledge instances with newly available information, updating the schema of the knowledge base 11, and rule mining for establishing new relationships and/or removing existing relationships between metadata and/or instances. Newly available information may be provided by a user or another device, such as a processing device or a sensor. Updating of the knowledge base 11 may be performed "on-the-fly", which refers updating the knowledge base 11 in response to dynamic factors, e.g., processing the newly available information as the information is received, which may include updating the knowledge base 11 immediately. Updating of the knowledge base 11 may also be performed as a predetermined condition is met, such as at regular timed intervals, upon a user or device generated request, upon sensing a condition, and/or upon accumulation of a predetermined amount of new information.

An example of a dynamic process in an exemplary knowledge base 11 related to a domain defined as a production printing workflow domain is provided in which a user is required to fill out a questionnaire via the UID 16. The information gathered is used to generate data instance for a new workstation to be added to the knowledge base 11, or modify an existing data instance. Among the questions posed in the questionnaire is the question shown below in Example 1.1

EXAMPLE 1.1

Questionnaire Question

What Are Your Existing Devices, Applications, or Services? (Optional) What devices, applications, or services does your business currently use? (Choose all that apply)

DC 2060 Printer
DC IGen3 Printer
DocuColor 6060
DocuPrint® 75/90 Printer
DocuPrint® 92C Printer
DocuPrint® CF 850/1900 Printer

NONE

Others

If the user determines that his device(s) is not listed in the options provided, he checks the "Others" option. Then a new instance schema corresponding to the device class is displayed on the screen for the user to select his unlisted device's specifications. User interactions for entering information into the questionnaire, such as via UID 16, are captured in an online log file. Similarly, a new data instance may be received from a remote device via interface 24 and captured as it is received, such as in an online log file. When a new instance is captured, the knowledge base 11 updates the instances currently in the knowledge base 11, so that if in the future another user or remote device accesses the same question, the newly added device is displayed in the choice list. Before adding the device to the listed devices it is necessary to verify if the new instance is a duplicate of an existing instance in knowledge base 11 by performing a field-dependent heuristic de-duplication algorithm, herein referred to as a comparison algorithm. If the new instance is determined to not be a duplicate of an existing instance, the new instance may be added to the existing instances stored by the knowledge base system 10. If the new instance is determined to be a duplicate of an existing instance, the existing instance may be updated (e.g., if the source of the information has privileges to do so) with the new information, which may be performed interactively or after the information is captured.

The comparison algorithm compares information stored in corresponding fields of the new instance and the existing instances for determining if the new instance is a duplicate of an existing instance for reducing instance redundancy in the knowledge base 11. The comparison algorithm approximates an exhaustive comparison by comparing data held in corresponding fields and generating a score for each field indicative of the comparison results for that field, where the score is referred to as a field similarity degree. Determination of duplication between the new instance and a stored instance is based on a combination of the field similarity degrees generated when comparing fields of the new instance to corresponding fields of the stored instance.

For fields holding character strings, the field similarity degree relates to the number of matching characters found in corresponding strings of characters while taking sequence of the characters into account. The string of characters may be broken into sub-strings, called tokens, where each token of a field of a new instance is compared to each token of a corresponding field of a stored instance, and each token of the corresponding field of the stored instance is compared to the tokens of the corresponding field of the new instance.

A comparison between a first token having x characters and a second token for determining a degree of matching between characters of the first token that and the characters of the second token which takes character sequence into account includes sequentially comparing characters of the first token with characters of the second token, and searching for a character which matches a character of the first token in characters of the second token which follow a previously found matching character. The similarity value is calculated with sequence taken into account as $(1-n/x)$ for n characters of the first token for which a match is not found in the second token. A similarity value set is generated for each token of both fields being compared by comparing the token of one of the fields being compared to each token of the other field being compared. A token similarity value is generated for each token, where the token similarity value is the maximum value of the similarity values in the similarity value set. The field similarity degree is determined using the token similarity values generated for each of the tokens of both fields being compared, and more specifically by summing the token similarity values and normalizing to 1.

An instance similarity degree indicative of similarity between the new instance and a stored instance is generated by combining the field similarity degrees generated for the fields of the stored instance. Combining of the field similarity degrees for generating the instance similarity degree may include summing the field similarity degrees. Furthermore, the instance similarity degree may be normalized to 1. Additionally, the field similarity degree for each field may be weighted. The instance similarity degree is compared to a threshold value for determining if the stored instance is a duplicate of the new instance. Accordingly, a comparison algorithm of the knowledge base 11 is executed by the processor assembly 12 for comparing information pertaining to creation of a new instance to the existing instances for determining whether the new instance will be added into the knowledge base 11 or not.

In one example, a user has a device named "DocuPrinter 525" which the user cannot find in the currently listed devices shown in example 1.1. The user chooses the "Others" option from the questionnaire's list of printer devices. The knowledge base system 10 presents a GUI for the user to enter new device properties. In example 1.2 below, a simplified device description for "DocuPrinter 525" is shown as entered by the user:

EXAMPLE 1.2

New Printer Instance (Instance 2)

DeviceID: 3a58de19

Name: DocuPrint 525

Description: DocuPrint 525 Continuous Feed

Manufacturer: Xerox

ManufacturerURL: http://www.xerox.com

PrintingType: ContinuousFed

ColorType: Monochrome

Speed (ppm): 532

ModelURL: http://www.xerox.com/go/xrx/equipment/product

The new printer data instance (Instance 2) is compared to each printer listed in example 1.1 to decide if it is a duplicate. To illustrate execution of an algorithm by the processor assembly 12 for finding duplicates with modifications in accordance with the present disclosure, a comparison is shown between the user entered instance for the DocuPrinter 525 and an exemplary instance already existing in the knowledge base 11 for a DocuColor 6060 Printer. In the comparison, the similarity between the two instances is calculated. If the outcome of the calculations indicates that the instance for the DocuPrinter 525 is redundant with respect to the DocuColor 6060 Printer, the new instance will not be automatically incorporated into the knowledge base 11 as a new instance. The exemplary instance, Instance 1, for the DocuColor 6060 Printer as it already exists in the knowledge base 11 is shown below in Example 1.3.

EXAMPLE 1.3

Existing DocuColor 6060 Printer (Instance 1)

DeviceID: 84e22bd2

Name: DocuColor 6060

Description: DocuColor 6060 Digital Color Press

Manufacturer: Xerox

ManufacturerURL: http://www.xerox.com

PrintingType: SheetFed

ColorType: FullColor

Speed (ppm): 60

Mode1URL: http://www.xerox.com/go/xrx/equipment/product

The comparison algorithm starts with computing an instance similarity value indicative of the similarity between respective corresponding fields of the two instances, Instance 1 and Instance 2. Next, the field similarity degrees for the respective fields are combined to determine whether the two instances are duplicates of each other. In accordance with the present disclosure, a field-dependent algorithm for execution by the processor assembly 12 is proposed in three aspects. In accordance with the first aspect, character sequence is taken into account while performing field comparisons. In accordance with the second aspect, different comparison algorithms are proposed for calculating the field similarity degree for fields having different field data types. In accordance with the third aspect, a predetermined weight is provided corresponding to each field, where the respective weights are based on the importance of the corresponding field in distinguishing between different devices or instances.

With respect to the first aspect, in the present example, the items or values held in each of the fields are character strings. Accordingly, the field comparison problem is essentially a string comparison problem. It is contemplated that one or more of the fields may hold (or have) items of types other than character strings (e.g., logical, integer, floating point, etc.), and that appropriate comparison algorithms be employed. The present disclosure provides an improvement to an algorithm for comparing fields having character string type items for minimizing duplication of instances in a knowledge base system, such as an algorithm described by Lee et al., in Mong Li Lee, Hongjun Lu, Tok Wang Ling and Yee Teng Ko in "Cleansing Data for Mining and Warehousing", *Proceedings of the* 10*th International Conference on Database and Expert Systems Applications* (*DEXA*), Florence, Italy, August 1999, by modifying the algorithm to take character sequence into consideration.

The comparison algorithm executed by the processor assembly 12, in accordance with the present disclosure, first divides the strings into meaningful tokens, after which tokens from the corresponding fields are compared and combined for determining the similarity degree of the fields. In a first example, the "Description" field for the two instances are compared. Specifically, the following two descriptions compared are shown in Example 1.4.

EXAMPLE 1.4

Description Fields

Instance 1 Description: DocuColor 6060 Digital Color Press

Instance 2 Description: DocuPrint 525 Continuous Feed

The data fields are tokenized by separating the description data into tokens. Respective sets of characters are separated into tokens. The division between a first and second set of characters may be denoted, for example, by a change in case, or the presence of a non-alphanumeric character, such as a space. The tokens may include lower case alpha characters, upper case alpha characters and numeric characters, while other characters are removed. The strings for the description fields for Instance 1 and Instance 2 are tokenized as shown in Example 1.5.

EXAMPLE 1.5

Tokenized Descriptions

Instance 1: Tokenized Description: {Docu Color 6060 Digital Color Press}

Instance 2: Tokenized Description: {Docu Print 525 Continuous Feed}

For a field having an enumeration field type, the step of tokenizing is skipped, since an enumeration field has a limited number of allowed values, respective allowed values representing a single concept. The field type associated with each field is determined when building the knowledge base. Separating an allowed value into tokens would unnecessarily complicate the process of determining similarity. For example, "FullColor", "Full-color", and "Full_Color" have the same meaning. Tokenizing "Full-Color" into two tokens "Full" and "Color" would make the algorithm complicated and time or resource consuming.

It is desirable for the process of comparing tokens to account for possible typographical errors, use of abbreviations, etc. In the algorithm described by Lee et al., a comparison of a token with x characters to another token is performed by deducting 1/x from the highest similarity value of 1 for each character that is not found in the other token. For instance, to compare "Docu" to "Color", the token similarity value is computed as Sim("Docu")=1−2/4=0.5, since two characters 'D' and 'u' are not found in "Color". In the algorithm described by Lee et al., the sequence of character occurrence is not taken into account.

In the present disclosure, the algorithm described by Lee et al. is modified by incorporating checking for character sequence. Furthermore, the comparison of characters is not case sensitive, which has the advantage of accommodating abbreviations. Processing the example shown above while using the comparison algorithm in accordance with the present disclosure, it is determined that 'D' is not found and 'o' is found in the token "Color". Next, when checking if 'c' is found in the token "Color", checking is only begun with the characters located after the first 'o' in the token "Color". Accordingly, 'c' is not found in the characters following 'o' in the token "Color". Nor is 'u' found in the token "Color". Thus, Sim("Docu")=1−3/4=0.25, which better indicates the degree of similarity between the tokens "Docu" and "Color".

Furthermore, the comparison algorithm, in accordance with the present disclosure, provides an improvement in determining that an appropriate abbreviated token matches a non-abbreviated token without the need for consulting an external table of abbreviations. A different example is shown here to demonstrate the ability and accuracy of the comparison algorithm, in accordance with the present disclosure, to account for abbreviation. The result for computing the token similarity value for the abbreviated token "SVCS" as compared to the token "Services" for the algorithm described by Lee et al., as well as for the algorithm in accordance with the present disclosure, is Sim("SVCS")=1, since all the characters in the token "SVCS" are found in the token "Services". However, if a similar, but different token, "SCVS", were compared to the token "Services", the algorithm described by Lee et al. would compute Sim("SVCS")=1, while the comparison algorithm, in accordance with the present disclosure, would compute Sim("SCVS")=1−1/4=0.75, which is a better indication of the degree of similarity.

Determining a field similarity degree for a first and second field being compared includes computing a token similarity value for respective tokens of the first field as compared to respective tokens of the second field. Computing a token similarity value for a first token of the first field includes computing a similarity value relating to a comparison between the first token of the first field and each token of the second field for generating a similarity value set, and determining a maximum value for the similarity value set. Using the same method, the token similarity value corresponding to each token of the first field as compared to the second field is determined. Likewise, the token similarity value corresponding to each token of the second field as compared to the first field is determined.

The method for determining the token similarity values for the first and second fields is demonstrated using the example above, where the description field for Instance 1 is the first field, and the description field for Instance 2 is the second field. First, the token "Docu" of the first field is compared to every token in the second field. The similarity value set generated is {1, 0, 0, 0.5, 0}. The token similarity value is the maximum value "1" of the similarity value set, also stated as Sim("Docu")=1. Using the same method, the similarity value for all of the tokens in the first field is {1 0.6 0 0.28 0.6 0.4}, and the similarity value for all of the tokens in the second field is {1 0.4 0 0.3 0.25}. The field similarity degree for the first and second fields is calculated by summing the token similarity values of both the first and second fields and normalizing to 1. Thus, the field similarity degree for the first and second fields of the present example is (1+0.6+0+0.28+0.6+0.4+1+0.4+0+0.3+0.25)/(6+5)=0.44.

With respect to the second aspect, an extra step is added after computing the field similarity degree for fields having an enumeration field type. Since the allowed values for enumeration fields are limited to specific entries, a determination of similarity can be more explicit than for a non-enumeration field type, e.g., the similarity degree may be "0" (not matching) or "1" (matching). In accordance with the comparison algorithm, in accordance with the present disclosure, the computed field similarity degree for an enumeration field is compared to a predetermined enumeration field threshold value. When the field similarity degree is above the enumeration field threshold value, the field similarity degree is determined to be "1". When the field similarity degree is below the enumeration field threshold value, the field similarity degree is determined to be "0".

In the above example for comparing the fields of Instance 1 and Instance 2, an enumeration field threshold value of 0.80 is used for computing the field similarity degree of fields having an enumeration field type. In the example, the "Color type" field is an enumeration field, in which two different values are allowed, where the values are "FullColor" and "Monochrome". The field similarity degree computed using the algorithm, in accordance with the present disclosure, is Sim("FullColor")=0.26, which is less than 0.8. Thus the final field similarity degree is 0. If a "Color type" field of a third instance having the value "Full-Color" were compared for similarity to the "Color type" field of the first instance, the field similarity degree computed is Sim("FullColor")=0.95, which is above the enumeration field threshold value of 0.8, providing a final field similarity degree of 1.

Field similarity degrees for the corresponding fields of Instance 1 and Instance 2 as computed using the algorithm, in accordance with the present disclosure, are as shown in Example 1.6

EXAMPLE 1.6

Field Similarity Degrees for Instances 1 and 2

| Field | Field Similarity Degree |
|---|---|
| DeviceID: | 0.30 |
| Name: | 0.37 |
| Description: | 0.44 |
| Manufacturer: | 1 |
| ManufacturerURL: | 1 |
| PrintingType: | 0 |
| ColorType: | 0 |
| Speed (ppm): | 0 |
| ModelURL: | 0.80 |

With respect to the third aspect, the concept of field weighting is applied for indicating the relative importance of fields of an instance for deciding similarity. The weights are pre-defined heuristically by developers, and the sum of the weights typically equals 1. In the present example, higher weights are assigned to fields with an enumeration field type, since their similarity degrees can be more explicitly determined. Lower weights are given to fields with an integer data type, since the effect of a typographical error affects the value of the data, causing the field to be less reliable. Weights assigned to fields with a string value data type are assigned in accordance with their degree of importance. Higher weights are assigned to fields, such as "DeviceID" and "Name", which are considered to be more critical, while lower weights are assigned to fields, such as "ModelURL", which are considered to be less critical. With the pre-defined weights, the instance similarity degree is computed as:

$$Sim(X, Y) = \sum_{i=1}^{n} Sim_{F_i}(X, Y) \times W_i = 0.316,$$

where X is a new data instance having n fields, and Y is an existing data instance. A table showing weights assigned to the fields of printer device instances is shown in Example 1.7:

EXAMPLE 1.7

Table of Weights Assigned to Fields

| Field: | Weights | |
|---|---|---|
| DeviceID: | 0.15 | |
| Name: | 0.10 | |
| Description: | 0.10 | |
| Manufacturer: | 0.10 | |
| ManufacturerURL: | 0.05 | |
| PrintingType: | 0.20 | // enumeration type |
| ColorType: | 0.20 | // enumeration type |
| Speed (ppm+++): | 0.05 | // integer |
| ModelURL: | 0.05 | |

To make a determination of whether "DocuPrint 525" is a duplicate of any of the printers already existing as instances in the knowledge base 11, the instance similarity values between the instance for "DocuPrint 525" and each of the instances of the other printers listed in Example 1.1 {"DC 2060 Printer", "DC IGen3 Printer", "DocuPrint® 75/90 Printer", "Docu-Print® 92C Printer", "DocuPrint® CF 850/1900 Printer"} are computed. Exemplary instance similarity values are provided as {0.32, 0.23, 0.30, 0.50, 0.35, 0.55}, respectively. The highest instance similarity value is compared to a predetermined instance similarity threshold value, such as 0.70. If the highest instance similarity value exceeds the instance similarity threshold value, it is indicated that the new printer corresponding to Instance 1 is a duplicate of the printer corresponding to the instance with the highest instance similarity value. Otherwise, the new printer instance is deemed as non-redundant and will be entered into the knowledge base 11 for updating the knowledge base 11. In the example shown, the highest instance similarity value of 0.55 is not greater than the instance similarity threshold value of 0.70, and it is determined that "DocuPrint 525" is a new printer device which should be entered as new instance into the knowledge base 11.

In another example, a user would like to enter a new instance for his printer device named "DC 6060 printer", which the user cannot find in the currently listed devices shown in example 1.1. However, the user does not realize that the user's "DC 6060 printer", is actually the same printer as "Docu 6060" which is listed with the listed devices shown in example 1.1. The user chooses the "Others" option from the questionnaire's list of printer devices. Example 1.8 below shows the simplified device description for "DocuPrinter 525" as entered by the user via the GUI provided for entering a new printer device. Also shown are the instance similarity values calculated when comparing the user's printer device to the instance for the listed "DocuColor 6060" printer:

Exp1.8

| Field | Value | Instance Similarity Value |
|---|---|---|
| DeviceID: | 84e22bd21 | 0.95 |
| Name: | DC 6060 Printer | 0.64 |
| Description: | Docu Color 6060 Digital Print | 0.89 |
| Manufacturer: | Xerox | 1.00 |
| ManufacturerURL: | http://www.xerox.com | 1.00 |
| PrintingType: | Sheet-Fed | 1.00 |

-continued

| Field | Value | Instance Similarity Value |
|---|---|---|
| ColorType: | Full-Color | 1.00 |
| Speed (ppm): | 68 | 0.5 |
| ModelURL: | XXXX(unknown) | 0 |

The overall instance similarity value (unweighted) of the "DC 6060 printer" to "DocuColor 6060" is 0.77, which is above the instance similarity threshold value 0.70. Accordingly, the "DC 6060 printer" is determined to be a duplicate of the existing printer "DocuColor 6060". The knowledge base system 10 may proceed by displaying the properties of "DocuColor 6060" to the user and ask the user whether the displayed properties correspond to the printer the user intends to add as new instance. If the user answers "no", the knowledge base system 10 may proceed by asking the user to specify the difference or provide information additional to and/or more updated than the information already stored, such as by using natural language. The natural language information may be captured for possible future usage by the knowledge base system 10.

It is envisioned that respective fields of an instance may hold more than one item. The steps for determining duplicity between a new instance and an existing instance account for checking the multiple items held in a field as well as generating a corresponding field similarity degree.

As new data is entered into the knowledge base 11 it is a goal to mine the associate rules or relationships hidden between the newly added instances themselves and between the newly added instances and the instances which already exist in the knowledge base 11. Newly entered information, such as information entered by a user via a questionnaire presented via a GUI, is captured in an online log file. In addition to capturing information requested by the questionnaire, the log file may further capture the user's general information, workflow patterns of the user, etc. Once a determination is made that the new instance is not redundant relative to existing instances, the new instance is entered into the knowledge base 11. The knowledge base 11 includes a rule mining algorithm, which is executed by the processor assembly 12 for extracting new associate rules associated with existing instances (e.g., which may include newly entered instances) and/or new instances not yet entered. The extracted rules are then encoded into the knowledge base 11.

It is contemplated that system designers may determine whether relations defined by the new associate rules have already been represented in the knowledge base 11, and/or verify the correctness of the new associate rules. The rules may then be used by the knowledge base 11 to generate new knowledge.

Execution of the rule mining algorithm includes finding combinations of items or values that have support above a minimum support value, e.g., a predetermined support threshold value, where the combinations are called large itemsets, as known in the art. The support measure specifies how important the rule is. Associate rule mining further includes determining a confidence value for a rule, which is the strength of the rule, as known in the art.

An Apriori algorithm is described by R. Agrawal et al., entitled "Fast algorithms for mining association rules", *Proceedings Of the 20th International Conference in Very Large Databases*, Santiago, Chile, September 1994 for finding large itemsets having a greater than minimal amount of support in which the number of itemsets that need to be counted for generating large itemsets is reduced relative to other known methods. In accordance with the present disclosure, a modification to the Apriori application is provided. The modification is described with respect to the following example.

In knowledge base system 10 of the present disclosure, information may be entered using a questionnaire, where the entered information is captured in an online log file and stored as an instance by the knowledge base 11 once a determination is made that it is not a duplicate. Fields and corresponding possible values for an exemplary instance are shown in Example 2.1

EXAMPLE 2.1

Instance and Field Values

| Field Type | Field Name | Field Values |
|---|---|---|
| S | User Region: | {Europe, Asia, Africa, North America, South America} |
| M | Application type: | {Manuals, brochures, catalogs, booklets, . . . } |
| S | Workflow pattern: | {P1, P2, . . . , Pn) |

The search space for discovering the large itemsets expands exponentially as the number of items occurring in the knowledge base 11 increases. In the Apriori algorithm described by Agrawal et al., any item may be combined with another item to be a candidate itemset of the search space. For example, in an instance having a name field for storing a character string, such as "{Alex}" or "{Bob}". The algorithm described by Agrawal et al., would combine the items "{Alex}" and "{Bob}" to count the frequency of the combination "{Alex, Bob}". However, in the rule mining algorithm in accordance with the present disclosure, it is expected that for certain fields, items from that field are independent of each other and would not be combined. A combination of values such as "{Alex, Bob}" would not occur in the name field, and thus need not be included in the candidate itemsets. In another field, multiple values may occur. For example, an instance may have a field for storing available devices, where a user can have more than one available device.

Figure 2:
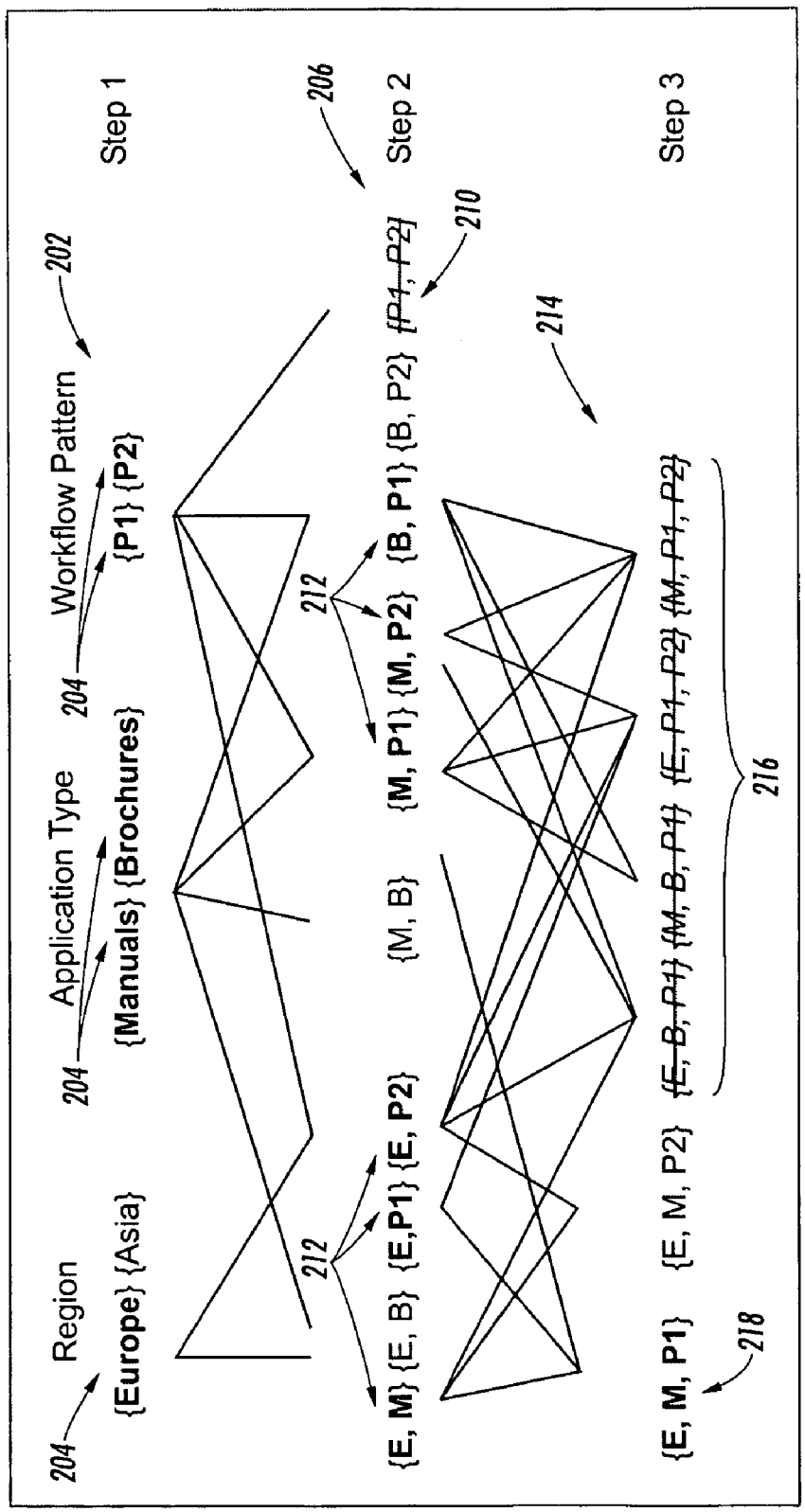
FIG. 2 is a diagram illustrating steps of an algorithm for mining rules of a knowledge base system in accordance with the present disclosure.

In accordance with the rule mining algorithm of the present disclosure, the field types "S" and "M" specify whether the field may hold a single value or multiple values, respectively. With reference to FIG. 2, at step 1, a first level of itemsets (1-itemsets) 202 is determined. The knowledge base 11 is traversed for determining the frequencies of the 1-itemsets. The 1-itemsets 202 having a support value above a minimum support value threshold value (MINSUP), e.g., the large-itemsets 204, are shown in bold. The bolded items are used as seeds for generating a second level of itemsets (2-itemsets) 206.

At step 2, candidate itemsets that are generated by the algorithm described by Agrawal et al, are shown using initials for the respective items. 2-itemsets that are eliminated in accordance with the rule mining algorithm of the present disclosure are shown as crossed out. Specifically, the itemset 210 with "{P1, P2}" is crossed out, since "workflow pattern" field is a single choice field and P1 and P2 would not occur together, and no rules are expected to be generated by combining the two independent items P1 and P2. In a very large database with many items, this step of eliminating itemsets having a combination of items from a single choice field potentially significantly decreases the candidate itemsets.

The instances of the knowledge base 11 are traversed to determine the occurrence frequency of each of the candidate itemsets for determining the corresponding support values. The 2-itemsets that have a support value which are above the MINSUP, e.g., the large itemsets 212, are marked in bold.

In step 3, six third level itemsets (3-itemsets) 214 are generated by using the six large itemsets 212 from step 2. For a k-itemsets to be large, all of its subsets with k-I items need to be the large (k-1)-itemsets. For example, "{E, B, P1}" has subsets with 2 items "{E, B}, {E, P1}, {B, P1}". Because the subset "{E, B}" is not a large itemset in step 2, "{E, B, P1}" is eliminated. In total, four itemsets 216 of the 3-itemsets are eliminated. Step 3 further illustrate that the rule mining algorithm of the present disclosure additionally eliminates the itemsets "{E, P1, P2}, {M, P1, P2}" from the candidate set, because "{P1, P2}" was eliminated in step 2. The itemsets that have a support value which are above the MINSUP, e.g., the large itemsets, are marked in bold, which in this step only include "{E, M, P1}". Accordingly, "{E, M, P1}" is the final large itemset 218.

After determining all of the large itemsets, the next step is to derive all possible associate rules with a confidence value above a minimum predetermined confidence threshold value (MINCONF), as in known in the art. In the present example, MINCONF=80%. Exemplary frequencies for the large itemsets are shown in Example 2.2.

EXAMPLE 2.2

Large Itemsets and Their Frequencies

| Itemsets | Frequency |
|---|---|
| {E} | 3000 |
| {M} | 3500 |
| {B} | 2000 |
| {P1} | 3000 |
| {P2} | 2000 |
| {E, M} | 1100 |
| {E, P1} | 2850 |
| {E, P2} | 1500 |
| {M, P1} | 2000 |
| {M, P2} | 1000 |
| {B, P1} | 1200 |
| {E, M, P1} | 1000 |

To find all association rules a respective final large itemset "1", each subset "a" of the final large itemset "1" is examined for determining if the ratio of frequency(1) to frequency(a) is above MINCONF. If so, a rule "a→(1-a)" is derived. For example, to derive all the rules from "{E, M, P1}", first all of the subsets "{E, M}, {E, P1}, {M, P1}, {E}, {M}, {P1}" are generated. The frequency ratios of the subsets of "{E, M, P1}" are, respectively, {90.9%, 35.1%, 50%, 33.3%, 28.6%, 33.3%}. The only subset having a ratio that is above MINCONF (80%) is {E, M}, from which the rule "E, M→P1" is derived. The meaning of this rule is that more than 91% of European users who want to print manuals would choose workflow pattern P1.

Additional rules may be derived by calculating a frequency ratio for subsets of each itemset having more than one item. In one example, the ratio of the frequency of subset (E) to the frequency of subset (E, P1) is 95%, which exceeds MINCONF. Accordingly another rule that can be derived is "Europe→P1", which means that 95% of European users favor workflow pattern P1. FIG. 4 shows an ontology model derived from rule "Europe→P1".

The rule "Europe→P1" may be used to update the knowledge base 11. For example, as an instance is entered into the knowledge base 11, the rule "Europe P1" may be used during a session with the questionnaire to provide a user from the region "Europe", with a prompt asking if the user's workflow pattern P1. For an instance being added to the knowledge base 11 in which the user is from the region "Europe", but the workflow pattern is not provided by the user, the rule may be used to determine that the workflow pattern is likely to be P1. Furthermore, existing instances stored in the knowledge base 11 indicating the region to be "Europe" and which do not indicate a workflow pattern may be updated to include a workflow pattern of P1. Additionally, in a case in which a "region" and/or "workflow pattern" field has not yet been encoded, the knowledge base 11 may be updated by adding a "region" and "workflow pattern" field to new and/or existing instances, entering information into the "region" field for new and/or existing instances wherever possible, and adding the rule "Europe→P1" into the knowledge base 11 for reasoning during automatic generation of workflow patterns.

In automatic workflow pattern generation, a workflow pattern model may be generated by automatically linking a user's constraints, and using the rules established for the knowledge base 11 to provide the user with a workflow pattern model having the best fit. After the rule "Europe→P1" is added to the knowledge base 11, a workflow pattern P1 is directly applied when deriving a workflow model pattern for a user from the region "Europe", largely reducing the number of workflow pattern models which satisfy the user's constraints.

It will be appreciated that various of the above-disclosed and other features and functions, or alternatives thereof, may be desirably combined into many other different systems or applications. The claims can encompass embodiments in hardware, software, or a combination thereof. Also that various presently unforeseen or unanticipated alternatives, modifications, variations or improvements therein may be subsequently made by those skilled in the art which are also intended to be encompassed by the following claims.

The invention claimed is:

1. A knowledge base system for managing a knowledge base executable by at least one processor for providing for collecting, organizing and receiving a data instance comprising:
   at least one storage device accessible by the at least one processor for storing a plurality of data instances;
   a user interface device for receiving the at least one data instance; and
   a memory storing a series of executable instructions executable by the at least one processor for capturing a received data instance and determining via a field dependent heuristic determination if the received data instance is a duplicate of any data instance of the plurality of stored data instances, wherein the series of executable instructions are further executed by the at least one processor to manage the knowledge base system as a dynamic knowledge base system comprising updating the knowledge base system, which includes storing the received data instance in the at least one storage device as a new data instance only when the determination of duplicity is that the received data instance is not a duplicate of any of the data instances of the plurality of stored data instances, wherein the received data instance and the plurality of stored data instances each include at least one field each having an item, each item including at least one token, each token including a sequence of at least one character; wherein the determination by the at least one processor comprises:
   for each field of the received data instance comparing between tokens of the at least one token of the field and the at least one token of a corresponding field of a respective stored data instance and generating at least one corresponding token similarity value, wherein each token comparison between a first token and a second token includes determining a degree of matching between characters of the at least one character of the first token that and the at least one character of the second token, including taking character sequence into account, and outputting a field similarity degree based on the at least one token similarity value; and
   for each respective stored data instance generating an instance similarity value based on the field similarity degree corresponding to the respective fields of the received data instance, wherein the determination of duplicity between the received data instance and the respective stored data instance is based on the instance similarity value.

2. The knowledge base system according to claim 1, wherein the updating is performed on-the-fly.

3. The knowledge base system according to claim 1, wherein determining a degree of matching between characters of the at least one character of the first token that and the at least one character of the second token which takes character sequence into account includes sequentially comparing characters of the first token with characters of the second token, and searching for a character in characters of the second token which follow a previously found matching character which matches a character of the first token.

4. The knowledge base system according to claim 1, wherein determining the number of characters includes generating a similarity value by calculating (1-n/x for n characters found which do not match, where x is the number of characters in the first token.

5. The knowledge base system according to claim 4, wherein a token similarity value is generated for each token of the at least one token of at least one of the field of the received data instance and the corresponding field of the stored data instance, wherein generating the token similarity value for a token of one of the fields of the field of the received data instance and the corresponding field of the stored data instance includes taking a maximum value of corresponding similarity values generated when comparing the token to each token of the at least one token of at least one item of the other field of the field of the received data instance and the corresponding field of the stored data instance.

6. The knowledge base system according to claim 5, wherein generating the field similarity degree for the field includes summing the token similarity values generated for the tokens of the at least one of the field of the received data instance and the corresponding field of the stored data instance, and normalizing to one.

7. The knowledge base system according to claim 6, wherein generating the instance similarity value for each respective stored data instance includes summing all of the field similarity degrees generated for the respective fields of the received data instance corresponding to the comparison to the corresponding fields of the respective stored data instance.

8. The knowledge base system according to claim 7, wherein generating the instance similarity value for each respective stored data instance further includes weighting each field similarity degree for the respective fields of the received data instance with a predetermined weight value corresponding to the respective field of the received data instance.

9. The knowledge base system according to claim 1, wherein the determination of duplicity for each data instance of the plurality of stored data instances includes comparing the generated instance similarity value to a predetermined threshold value.

10. The knowledge base system according to claim 1, wherein when the field is an enumerated type field, generating the field similarity degree for the field further comprises assigning one of a high value and a low value in accordance with comparison of results of the output field similarity degree with a predetermined enumeration field threshold value.

11. The knowledge base system according to claim 1, wherein a field type is provided in association with each field of the received data instance and the stored data instances of the plurality of stored data instances for indicating whether the associated field is allowed to have one of only a single item and multiple items.

12. The knowledge base system according to claim 11, wherein the series of executable instructions are further executed by the at least one processor to manage the knowledge base system as a dynamic knowledge base system including generating associate rules associated with the plurality of stored data instances, comprising determining at least one large itemset including at least one combination of at least one item that has support above a minimum predetermined support threshold value including eliminating at least one itemset having a combination of more than one item held by a field having an associated field type indicating that the field is allowed to have only a single value, and processing the remaining a least one itemset for deriving at least one associate rule.

13. A knowledge base system for managing a knowledge base executable by at least one processor for providing for collecting, organizing and receiving a data instance for operation in a production printing workflow environment comprising:
  at least one storage device accessible by at least one processor for storing a plurality of data instances; and
  a memory storing a series of executable instructions executable by the at least one processor for generating at least one associate rule associated with a plurality of stored data instances, wherein the plurality of stored data instances each include at least one field, each having at least one item, and an associated field type for indicating whether the field is allowed to have one of only a single item and multiple items, wherein the generating at least one associate rule by the at least one processor comprises:
  generating a plurality of itemsets formed of possible combinations of at least one item selected from the at least one item corresponding to the at least one field of the plurality of stored data instances;
  eliminating at least one itemset from the plurality of itemsets having a combination of more than one item corresponding to a field having an associated field type indicating that the field is allowed to have only a single value; and
  processing a remaining at least one itemset for deriving at least one associate rule.

14. The knowledge base system according to claim 13, further comprising an interface device for receiving at least one data instance, wherein the series of executable instructions are further executed by the at least one processor for capturing the received data instance and managing the knowledge base system as a dynamic knowledge base system, comprising storing the received data instance with the plurality of stored data instances, and attempting to generate at least one associate rule associated with the plurality of data instances, including the received data instance.

15. The knowledge base system according to claim 13, wherein the generating at least one associate rule further comprises:
  selecting an itemset from the at least one remaining itemset when a percentage of data instances of the plurality of stored data instances in which all of the items of the selected itemset occur in items corresponding to the at least one field of the respective data instances exceeds a predetermined support threshold value, and
  eliminating any unselected itemsets from the at least one remaining itemset before processing the at least one remaining itemset for deriving the at least one associate rule.

16. The knowledge base system according to claim 15, wherein processing the at least one remaining itemset for deriving at least one associate rule therefrom comprises:
  generating each possible subset of the selected itemset;
  determining for each generated subset a ratio of a frequency of occurrence of the subset to a frequency of occurrence of the selected itemset; and
  deriving a rule:
    if (items of the selected itemset) then (items of the selected itemset take away the items of the subset) when the ratio exceeds a predetermined confidence threshold value.

17. A method for managing a knowledge base system, the method comprising:
  storing a plurality of data instances, each data instance of the plurality of data instances including at least one field each having at least one item;
  providing each field of the at least one field with an associated field type for indicating whether the field is allowed to have one of only a single item and multiple items;
  generating a plurality of itemsets formed of possible combinations of at least one item selected from the at least one item corresponding to the at least one field of the plurality of stored data instances;
  eliminating at least one itemset having a combination of more than one item corresponding to a field having an associated field type indicating that the field is allowed to have only a single value; and
  processing at least one remaining itemset for generating at least one associate rule.

18. The method according to claim 17, wherein the method further comprises updating a schema of the knowledge base with the generated at least one associate rule.

19. The method according to claim 17, further comprising:
  receiving at least one data instance;
  capturing a received data instance; and
  managing the knowledge base system as a dynamic knowledge base system comprising:
    storing the received data instance with the plurality of stored data instances; and
    attempting to generate at least one associate rule associated with the plurality of data instances including the received data instance.

20. The method according to claim 19, wherein the attempting to generate the at least one associate rule is performed on-the-fly.

21. The method according to claim 17, further comprising selecting an itemset from the at least one remaining itemset when a percentage of data instances of the plurality of stored data instances in which all of the items of the selected itemset occur in items held in the at least one field of the respective data instances exceeds a predetermined support threshold value; and eliminating any unselected itemsets from the at least one remaining itemset before processing the at least one remaining itemset for generating the at least one associate rule.

22. The method according to claim 21, wherein processing the at least one remaining itemset comprises:

generating each possible subset of the selected itemset;

determining for each generated subsets a ratio of a frequency of occurrence of the subset to a frequency of occurrence of the selected itemset; and deriving a rule: if (items of the selected itemset) then (items of the selected itemset take away the items of the subset) when the ratio exceeds a predetermined confidence threshold value.

* * * * *